(12) United States Patent
Kapp

(10) Patent No.: US 11,295,191 B2
(45) Date of Patent: Apr. 5, 2022

(54) SECURE RFID DEVICE

(71) Applicant: ASSA ABLOY AB, Stockholm (SE)

(72) Inventor: Hugo Kapp, St Gingolph (FR)

(73) Assignee: ASSA ABLOY AB, Stockholm (SE)

( * ) Notice: Subject to any disclaimer, the term of this patent is extended or adjusted under 35 U.S.C. 154(b) by 249 days.

(21) Appl. No.: 16/780,082

(22) Filed: Feb. 3, 2020

(65) Prior Publication Data

US 2020/0265289 A1 Aug. 20, 2020

(30) Foreign Application Priority Data

Feb. 18, 2019 (EP) ..................................... 19157645

(51) Int. Cl.
*H01L 35/00* (2006.01)
*G06K 19/077* (2006.01)

(52) U.S. Cl.
CPC . *G06K 19/07775* (2013.01); *G06K 19/07728* (2013.01); *G06K 19/07747* (2013.01)

(58) Field of Classification Search
CPC ....... G06K 19/07345; G06K 19/07709; G06K 19/07728; G06K 19/07747; G06K 19/07773; G06K 19/07775; G06K 19/07783
See application file for complete search history.

(56) References Cited

U.S. PATENT DOCUMENTS

| | | | | |
|---|---|---|---|---|
| 8,608,080 B2* | 12/2013 | Finn | ........................ | H01L 24/85 235/492 |
| 2012/0080527 A1* | 4/2012 | Finn | ................ | G06K 19/07745 235/492 |
| 2014/0104133 A1* | 4/2014 | Finn | ..................... | H01Q 1/2283 343/866 |
| 2014/0284386 A1* | 9/2014 | Finn | ........................ | H01Q 7/06 235/488 |
| 2017/0077589 A1* | 3/2017 | Finn | ..................... | H04B 5/0056 |
| 2018/0123221 A1* | 5/2018 | Finn | ..................... | H01Q 7/005 |
| 2018/0339503 A1* | 11/2018 | Finn | ..................... | H01Q 1/2225 |
| 2019/0114526 A1* | 4/2019 | Finn | ....................... | H01Q 21/29 |

(Continued)

FOREIGN PATENT DOCUMENTS

| DE | 19645083 A1 | 5/1998 |
|---|---|---|
| DE | 19742126 A1 | 3/1999 |

(Continued)

OTHER PUBLICATIONS

"European Application Serial No. 19157645.3, Extended European Search Report dated Aug. 1, 2019", 7 pgs.

(Continued)

*Primary Examiner* — Thien M Le
(74) *Attorney, Agent, or Firm* — Schwegman Lundberg & Woessner, P.A.

(57) ABSTRACT

A secure RFID device is provided. The RFID device includes a switch module mounted in a recess of a device body. The switch module includes a switching portion configured to electrically connect terminal ends of an RFID antenna embedded in the switch body. In particular, forming the recess and mounting the switch module including the switching portion to the RFID device after final lamination of the same allows for the use of manufacturing techniques that result in RFID cards having high durability and required ISO qualities.

20 Claims, 2 Drawing Sheets

(56) References Cited

U.S. PATENT DOCUMENTS

2021/0182650 A1\* 6/2021 Lotya ............... G06K 19/07794
2021/0192312 A1\* 6/2021 Lotya ................... H05K 3/0061

FOREIGN PATENT DOCUMENTS

| EP | 1544787 A1 | 6/2005 |
| EP | 1877967 B1 | 5/2014 |
| WO | WO-2012168106 A1 | 12/2012 |

OTHER PUBLICATIONS

"European Application Serial No. 19157645.3, Response filed Feb. 11, 2021 to Extended European Search Report dated Aug. 1, 2019", 19 pgs.

\* cited by examiner

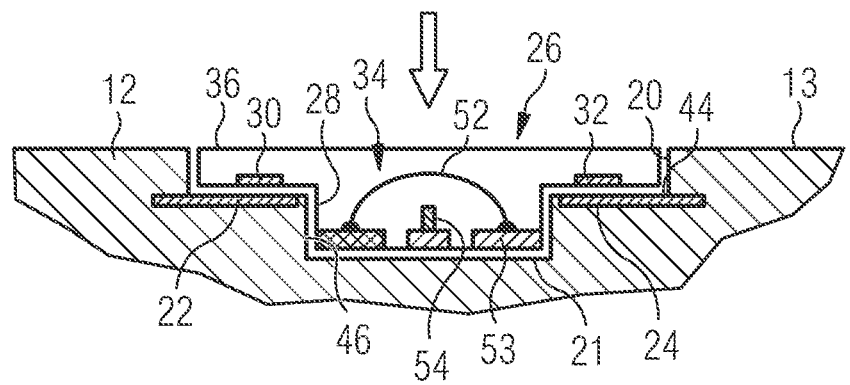
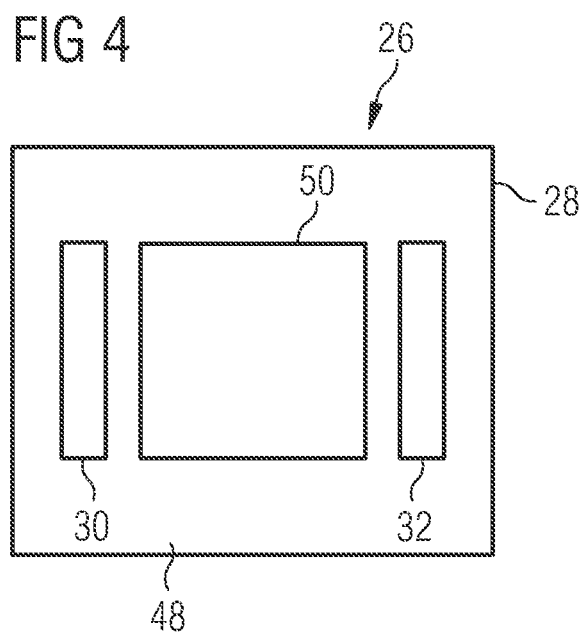

SECURE RFID DEVICE

CROSS-REFERENCE TO RELATED APPLICATION(S)

This application claims priority to European patent application no. 19157645, filed Feb. 18, 2019, which is hereby incorporated by reference herein in its entirety.

TECHNICAL FIELD

The present disclosure generally relates to radio frequency identification (RFID) devices, in particular, to an RFID device that can prevent unauthorized access to data stored on the RFID device.

BACKGROUND

Generally, RFID devices such as, for example, RFID cards, RFID tags, etc. include an RFID antenna and an integrated circuit connected to the RFID antenna. Upon presence of an electromagnetic field emitted by a reader device, the RFID antenna supplies energy from the electromagnetic field to the integrated circuit, which integrated circuit may communicate with the reader device using radio frequency (RF) communication protocols. In this manner, for example, data can be read from a memory associated with the integrated circuit, and can also be written into said memory, if desired.

U.S. Pat. No. 8,474,710 B2 discloses an access control proximity card with an actuation sensor. An access electronics system of the proximity card is configured to activate the same in response to an input from the actuation sensor to enable communication of access information from the proximity card.

The present disclosure is directed, at least in part, to improving or overcoming one or more aspects of prior systems.

SUMMARY OF THE DISCLOSURE

According to one aspect of the present disclosure, an RFID device comprises a device body having a first surface, an open-circuit RFID antenna embedded in the device body and having a first terminal end and a second terminal end, and a recess formed in the first surface and having a bottom. A first electrical contact and a second electrical contact are provided on the bottom and are electrically connected to the first terminal end and the second terminal end, respectively. A switch module is mounted at least in part in the recess. The switch module includes a switch housing, a first switch contact exposed from the switch housing and electrically connected to the first electrical contact, a second switch contact exposed from the switch housing and electrically connected to the second electrical contact, and a switching portion configured to electrically connect the first switch contact and the second switch contact upon actuation by a user.

According to another aspect of the present disclosure, a method of manufacturing an RFID device comprises providing a planar pre-laminate, with an open-circuit RFID antenna having a first terminal end and a second terminal end, and a first electrical contact and a second electrical contact being formed on the pre-laminate. The first electrical contact and the second electrical contact are electrically connected to the first terminal end and the second terminal end, respectively. The method further comprises laminating the pre-laminate with at least one further laminate layer provided on top of the pre-laminate to form a device body of the RFID device. The method further comprises processing a region of a first surface of the device body to form a recess exposing at least in part the first electrical contact and the second electrical contact. A switch module including a switch housing, a first switch contact exposed from the switch housing, a second switch contact exposed from the switch housing, and a switching portion configured to electrically connect the first switch contact and the second switch contact upon actuation by a user is inserted into the recess. The first switch contact is electrically connected to the first electrical contact, and the second switch contact is electrically connected to the second electrical contact.

Other features and aspects of the present disclosure will be apparent from the following description and the accompanying drawings.

BRIEF DESCRIPTION OF THE DRAWINGS

FIG. 3 is a partial sectional view of the RFID device of FIG. 1 showing a switch module in accordance with the present disclosure.

FIG. 4 is a bottom view of the switch module of FIG. 3.

DETAILED DESCRIPTION

Figure 1:
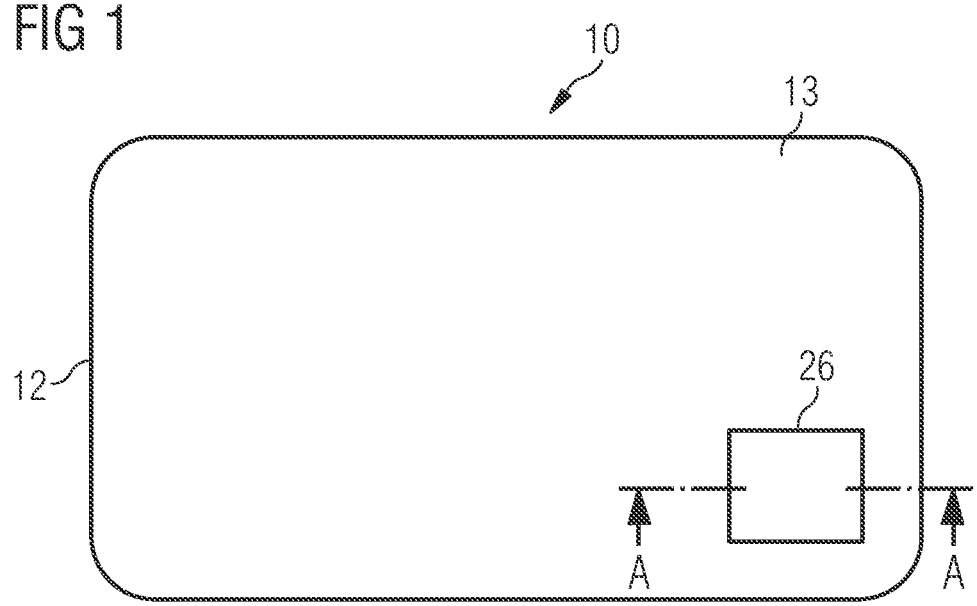
FIG. 1 is a plan view of an RFID device in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that, with the previous techniques for providing an actuation sensor such as a mechanical switch on an RFID card, such RFID cards have to be formed by cold lamination (bonding) in order to connect the actuation sensor to the RFID antenna. However, this increases the cost associated with manufacturing the RFID card, and also may not meet the requirements with respect to the qualities of ISO cards. According to the present disclosure, it has been realized that, with an appropriate configuration, it is possible to integrate anti-skimming protection into RFID devices, for example, RFID cards, using other manufacturing methods, in particular, high-temperature lamination (rolling) of RFID boards.

In particular, the present disclosure is based at least in part on the realization that it is advantageous to first laminate the laminated RFID device including the RFID antenna and, optionally, an integrated circuit connected to the same, and to then process the RFID device in order to allow connection of the protection module. To this end, it has been realized that a pre-laminate including the RFID antenna should include a receiving zone for the protection module. For example, meanders formed on terminal ends of the RFID antenna, or copper pads or the like can be formed in the receiving zone for the protection module. After final lamination and punching of the card, processing of the surface of the same, for example, by milling, allows the integration of the protection module and the connection of the electronic contacts formed on the protection module with the corresponding contacts provided in the receiving zone of the pre-laminate. In this manner, an appropriate protection module including, for example, a mechanical switch provided in a switch housing, can be reliably and securely connected to the RFID antenna and the RFID device. Further, potential damaging of the protection module during manufacturing of the RFID device, for example, due to the high temperatures and pressures used in a hot lamination process, can be avoided, as the protection module is only connected to the RFID device after lamination of the same has been completed.

Further, the present disclosure is based at least in part on the realization that providing a recess having a stepped configuration in the surface of the RFID device allows for precise positioning of the corresponding protection module with respect to the receiving zone. In addition, it has been realized that providing the electrical contacts on the protection module such that they have a strip-like configuration can assure that the contacts can be reliably connected to the underlying receiving zone of the RFID device. This also increases a manufacturing tolerance. In this respect, it has also been realized that it is advantageous to form the electrical contacts of the receiving zone as a pair of extended land portions formed on the pre-laminate, for example, a pair of square metallic contacts.

Referring now to the drawings, FIG. 1 shows a plan view of an RFID device in accordance with the present disclosure. In the example shown in FIG. 1, the RFID device is configured as an RFID card 10, which may be used as an access card, a debit card, a credit card, or the like. It will be appreciated, however, that the RFID device 10 may also be configured in a different shape, for example, as an RFID tag, a token, etc. Further, the RFID device 10 may be used for any appropriate purpose, for example, to gain access to a building or the like, as a means for payment, as a means for identification of a user/holder of the RFID device, etc. The applications of RFID devices are well-known and will therefore not be described in detail.

As shown in FIG. 1, the RFID device 10 comprises a device body 12 formed in the shape of a substantially rectangular card or sheet. The device body 12 has a first surface 13. In the exemplary embodiment, the first surface 13 is the top surface of the RFID device 10. Provided on the first surface 13 is a switch module 26 configured to be actuated by a user, as will be described in more detail below.

In particular, as shown in FIG. 3, which shows a partial cross-section of the RFID device 10 of FIG. 1 along the line A-A, the switch module 26 is mounted in a recess 20 formed in the first surface 13. As shown in FIG. 3, the recess 20 has a bottom 21. In the exemplary embodiment shown in FIG. 3, the bottom 21 has a stepped configuration with an annular peripheral portion 44 surrounding a central recessed portion 46.

As shown in FIG. 3, the switch module 26 includes a switch housing 28, a first switch contact 30 exposed from the switch housing 28, and a second switch contact 32 exposed from the switch housing 28. The first and second switch contacts 30, 32 are configured as appropriate electrical contacts. An example for a detailed configuration of the first and second switch contacts 30, 32 will be described in the following.

As shown in FIGS. 3 and 4, the switch housing 28 has a shape that matches the stepped configuration of the bottom 21 of the recess 20. In particular, the switch housing 28 includes an annular peripheral connecting portion 48 on which the first switch contact 30 and the second switch contact 32 are provided, and a central (for example, square or rectangular) protrusion 50 accommodating a switching portion 34, which will be described in the following.

Figure 2:
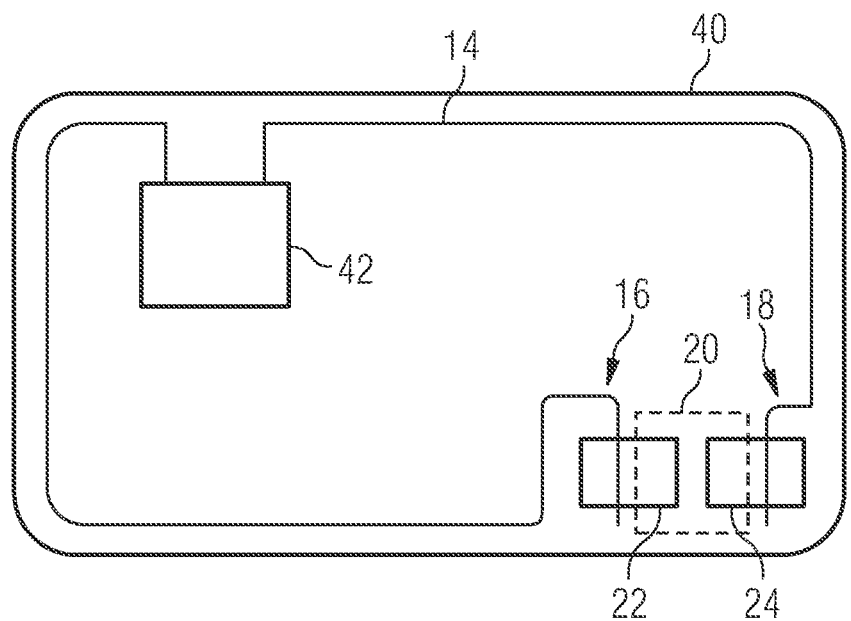
FIG. 2 is a plan view of a pre-laminate of an RFID device in accordance with the present disclosure.

As also shown in FIGS. 2 and 3, a first electrical contact 22 and a second electrical contact 24 are provided on the bottom 21 of the recess 20 and are electrically connected to an RFID antenna 14. As shown in FIG. 2, the RFID antenna 14 is configured as an open-circuit RFID antenna. The RFID antenna may be configured in any appropriate shape, with an appropriate number of turns or windings, although for the sake of simplicity only a single antenna winding is shown. An integrated circuit 42, which serves as a control unit, is connected to the RFID antenna 14 in any appropriate manner. Accordingly, in case the winding of the RFID antenna 14 is closed (electrically connected), as will be described below, the RFID antenna 14 can supply power to the integrated circuit 42, which in turn may facilitate communication between the RFID device 10 and an appropriate reader device. RFID communications and their corresponding protocols and means for implementing the same are well-known, such that a detailed description will be omitted.

As can be seen from FIG. 2, in the idle state, i.e., when a user is not actuating the switch module 26 to connect the contacts 22, 24, the electrical circuit of the RFID antenna 14 is open. In other words, a first terminal end 16 and a second terminal end 18 of the RFID antenna 14 are not electrically connected to each other. Therefore, no electrical current can be induced in the winding of the RFID antenna 14, and no power can be supplied to the integrated circuit 42. Therefore, RFID communications, for example, in order to read data stored in a memory (not shown) associated with the integrated circuit 42 cannot be read out from the RFID device 10.

As will be appreciated by the skilled person, the RFID antenna 14 is provided on a substrate, which forms a pre-laminate 40. Methods for providing the RFID antenna 14 on the pre-laminate 40 are well-known, and will therefore not be described in detail. Likewise, any methods for connecting the integrated circuit 42, which may be configured as any appropriate control unit, to the RFID antenna 14 are also well-known, and will also not be described in further detail herein. It will be appreciated that, although integrated circuit 42 is shown as being provided on the pre-laminate 40, integrated circuit 42 may also be provided in or on a different layer of the laminate of the RFID device 10, and may be electrically connected to the RFID antenna 14 in an appropriate manner.

As can be seen in FIG. 2, the first electrical contact 22 and the second electrical contact 24 are provided on the top surface of the pre-laminate 40, substantially in the same plane as the RFID antenna 14. Further, the terminal ends 16, 18 of the RFID antenna 14 are electrically connected to the first and second electrical contacts 22 and 24, respectively.

In the exemplary embodiment, the first electrical contact and the second electrical contact are configured as a pair of rectangular land portions formed on the planar pre-laminate 40. Further, at least part of the first and second electrical contacts 22, 24 is provided in a region that overlaps with the recess 20, which is indicated by a dashed line in FIG. 2.

Returning to FIG. 3, it can be seen that the first switch contact 30 of the switch module 26 is electrically connected to the first electrical contact 22, more particularly, the part of the same that is provided at the bottom 21 of the recess 20. Likewise, the second switch contact 32 is electrically connected to the second electrical contact 24, more particularly, the part of the same that is provided on the bottom 21 of the recess 20.

As shown in FIG. 3, the switch module 26 is configured such that, upon actuation by a user, in particular, pressing down on a top surface of the switch housing 28, the first switch contact 30 and the second switch contact 32 of the switch module 26 are electrically connected. Accordingly, as will be readily appreciated, the first electrical contact 22 and the second electrical contact 24 are electrically connected, and in this manner the circuit of the RFID antenna 14 is closed. In this state of actuation of the switch module 26, the RFID antenna 14 can supply power to the integrated circuit 42, and RFID communications can be performed.

An exemplary configuration of the switch module 26 will be described in more detail in the following. In particular, at least a portion of the switch housing 28 to be actuated by the user is made of a resilient material. In the example, at least the top surface 36 of the switch housing 28 is made of the resilient material. For example, the resilient material may be a resin or other plastically deformable material with a thickness which allows depression due to a force applied by, for example, a thumb or an index finger of a user. In some embodiments, the entire switch housing 28 may be integrally formed of the resilient material.

As shown in FIG. 4, which shows a bottom view of the switch module 26, the first switch contact 30 and the second switch contact 32 are configured as strip-like electrically conducting members extending in parallel on opposite sides of the switch housing 28. In particular, the strip-like electrically conducting members extend in parallel on opposite sides of the central protrusion 50 on the peripheral portion of the switch housing 28. Upon insertion and mounting of the switch module 26 in the recess 20, the first and second switch contacts 30 and 32 are electrically connected to the first and second electrical contacts 22, 24 on the bottom 21 of the recess 20. In some embodiments, the mounting/electrical connection may be achieved by using an electrically conducting adhesive, for example, using a known process similar to the one that is used to connect a dual interface contact chip to a wire embedded antenna. In this manner, the switch module 26 can be securely mounted in the recess 20 while the respective electrical contacts are connected at the same time.

In the example shown in FIG. 3, the top surface 36 of the switch housing 28 is substantially in the same plane as the first surface 13 in the mounted state. However, it will be appreciated that, in other embodiments, the switch module 26 may be mounted such that the upper part of the same protrudes from the first surface 13. This may facilitate actuation of the switch module 26 by the user. In other embodiments, the switch housing 28 may include a contoured top surface 36 configured to be actuated by the user, the contoured surface 36 including, for example, at least one groove, at least one protrusion, or a rippled structure. Any structure that gives an appropriate tactile feedback to the user and allows easily identifying the portion of the switch module 26 to be actuated can be used.

An exemplary internal configuration of the switch module 26 will be described in the following. In the example, the switch housing 28 accommodates the switching portion 34, which includes an electrically conducting flexible member 52 accommodated in the switch housing and configured to be brought into contact with an electrically conducting switch terminal 54, which is also accommodated in the switch housing, upon actuation of the switch module 26 by the user. The flexible member 52 may be configured as any appropriate flexible member, for example, a leaf spring made of metal or any other appropriate electrically conducting flexible material, which may form an arc-shape in the idle state, and which may be depressed by the top surface 36 of the switch housing 28 being pressed down by the user, as shown by the arrow in FIG. 3. However, it will be appreciated that any other appropriate configuration can be used for switching portion 34, for example, a configuration including a push-button or the like, which is actuated while the top surface 36 is pressed down by the user, and released when the top surface returns to its initial position, or upon a further actuation by the user.

In the exemplary embodiment, one end portion of the flexible member 52 is connected to an electrically conducting base section 53, which in turn may be electrically connected to one of the first and second switch contacts 30, 32. Provided below the flexible member 52 is the switch terminal 54, which is contacted by the flexible member 52 as the top surface 36 of the switch housing 28 is depressed by the user. The switch terminal 54 is electrically connected to the other one of the first and second switch contacts 30, 32. Accordingly, as long as the user presses down on the top surface 36 of the switch housing 28, the electrical circuit between the switch contacts 30, 32 is closed, and, as described above, the electrical circuit of the RFID antenna 14 is also closed. When the user stops pressing down on the top surface of the switch housing 28, the flexible member 52 returns to its initial position and separates from the switch terminal 54. Accordingly, the corresponding electrical circuits are again opened.

As will be readily appreciated from the above, with the exemplary embodiment of the RFID device 10 described herein, the RFID communication means of the RFID device 10 can be selectively activated by a user by actuating the switch module 26, in particular, by pressing down on the top surface of the same. In this manner, the user can determine when RFID communications can or should be performed by the RFID device 10. Therefore, so-called "skimming", where data from the integrated circuit 42 is read out by an unauthorized party without the user's permission, can be prevented.

Although in the above-described embodiment the switch module 26 is provided with a stepped recess 20 and the correspondingly configured housing 28, it will be appreciated that in other embodiments the stepped configuration can be omitted. In other words, the bottom 21 may be planar. Likewise, although the recess 20 has been described above as being substantially rectangular, it will be appreciated that any appropriate shape can be used, as long as the switch housing 28 has a matching shape. For example, a circular or elliptical recess 20 could be used.

Further, although the switch module 26 has been described above as a mechanically actuated switch, in other embodiments, the switching portion 34 may include a pair of contact portions provided on an exposed surface of the switch housing 28 and configured to be electrically connected by the user contacting the pair of contact portions. In other words, it is the user that electrically connects the pair of contact portions, which in turn are electrically connected to the first switch contact 30 and the second switch contact 32. Also in this manner, the above-described effect can be achieved.

Further, while the first and second electrical contacts 22, 24 have been described above as a pair of rectangular land portions, it will be appreciated that the first and second electrical contacts are not limited to this configuration. For example, other shapes may be used for the land portions, such as a circular shape, an elliptical shape, a strip-like configuration etc.

In some embodiments, the land portions may be omitted, and the first and second electrical contacts may be configured as a pair of meandering end portions of the RFID antenna 14 extending from (integrally formed with) the first terminal end 16 and the second terminal end 18. In this manner, the meandering end portions also cover an extended area on the pre-laminate 40, which assures a reliable contacting of the same by the first and second switch contacts 30, 32 provided on the switch housing 28.

INDUSTRIAL APPLICABILITY

As described above, with the RFID device according to the present disclosure, a secure RFID device can be provided, where a user can determine when RFID communications between the RFID device and an external reader are possible/allowed or not. In particular, as described above, with the modular configuration of the RFID device including the switch module 26, a method of manufacturing the RFID device 10 may be used that results in reduced costs and an increased quality of, for example, RFID cards. An exemplary high-temperature process for manufacturing the RFID device 10 will be described below.

In a first step, a planar pre-laminate 40 shown in FIG. 2 is provided. The planar pre-laminate 40 includes an open-circuit RFID antenna 14 having a first terminal end 16 and a second terminal end 18, and a first electrical contact 22 and a second electrical contact 24 formed on the pre-laminate 40. The first electrical contact 22 and the second electrical contact 24 are electrically connected to the first terminal end 16 and the second terminal end 18, respectively. Any known method of forming the RFID antenna 14 and the first and second electrical contacts 22, 24, for example, etching, sputtering, and the like may be used. Optionally, an integrated circuit 42 is connected to the RFID antenna 14 in any appropriate known manner. The skilled person will readily appreciate that the pre-laminate 40 serves as a substrate for the RFID antenna 14 and the integrated circuit 42. Of course, the pre-laminate 40 may be connected to or include a plurality of layers of material. The formation of an RFID antenna structure on a substrate or pre-laminate is well known, and will therefore not be described in detail herein.

After obtaining the pre-laminate 40 with the RFID antenna 14 as shown in FIG. 2, the pre-laminate 40 is laminated with at least one further laminate layer provided on top of the pre-laminate 40 to form a device body 12 of the RFID device. Here, any known high-temperature lamination process may be used, for example, rolling or the like. In such a process, as known to the skilled person, different layers of material are subjected to heat, pressure, etc. for a given time, until a homogeneous layer (laminate) is obtained. As a result, the device body 12, which may have a substantially rectangular shape and include an upper surface 13 is obtained. In this state, it should be noted that the RFID antenna 14 and the first and second electrical contacts 22, 24 are embedded in the device body 12 and are not exposed to the outside.

In order to connect the switch module 26 to the first and second electrical contacts 22, 24, a region of the upper surface 13 of the device body 12 is processed to form the recess 20 exposing at least in part the first electrical contact 22 and the second electrical contact 24. It will be readily appreciated that any known method may be used to process the upper surface 13 of the device body 12 in order to form the recess 20. For example, milling may be performed in order to expose the first and second electrical contacts 22, 24. In particular, the processing may be performed to obtain the stepped recess 20 shown in the example of FIG. 3.

In a subsequent step, the switch module 26 including the switch housing 28, the first switch contact 30 and the second switch contact 32, as well as the switching portion 34 described above is inserted into the recess 20.

Finally, the first switch contact 30 is electrically connected to the first electrical contact 22, and the second switch contact 32 is electrically connected to the second electrical contact 24. For example, an electrically conducting adhesive may be applied to the bottom 21 of the recess 20 and/or the bottom of the switch module 26. By using such an adhesive, the switch module 26 is also securely mounted in the recess 20.

Although in the method described above a single RFID device 10 was described, it will be appreciated that the above-mentioned processes can be performed on a larger sheet including a plurality of device bodies 12. In this case, the individual RFID device 10 can be separated from the sheet after the final lamination has been performed, and the further processing, i.e. connection of the switch module 26, may be performed on the individual RFID devices 10. However, it is also contemplated that the connection of the switch modules 26 may also be performed while the individual RFID devices 10 have not yet been separated from each other.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A RFID device comprising:
a device body having a first surface;
an open-circuit RFID antenna embedded in the device body and having a first terminal end and a second terminal end;
a recess formed in the first surface and comprising a stepped configuration with a peripheral portion at a first depth from the first surface surrounding a central recessed portion at a second depth from the first surface that is deeper than the first depth;
a first electrical contact and a second electrical contact provided on the peripheral portion, the first electrical contact being electrically connected to the first terminal end, and the second electrical contact being electrically connected to the second terminal end; and
a switch module mounted at least in part in the recess, the switch module comprising:

a switch housing comprising a stepped configuration substantially corresponding to the stepped configuration of the recess and having a peripheral connecting portion and a central protrusion;

a first switch contact exposed from the switch housing on the peripheral connecting portion and electrically connected to the first electrical contact;

a second switch contact exposed from the switch housing on the peripheral connecting portion and electrically connected to the second electrical contact; and a switching portion configured to electrically connect the first switch contact and the second switch contact upon actuation by a user.

2. The RFID device of claim 1, wherein a top surface of the switch housing is substantially in the same plane as the first surface.

3. The RFID device of claim 1, wherein the central protrusion accommodates the switching portion.

4. The RFID device of claim 1, wherein at least a portion of the switch housing to be actuated by the user is made of a resilient material.

5. The RFID device of claim 4, wherein the switch housing includes an exposed contoured surface configured to be actuated by the user, the contoured surface including at least one of a groove, a protrusion, and a rippled structure.

6. The RFID device of claim 4, wherein the switching portion comprises an electrically conducting flexible member accommodated within the switch housing and configured to be brought into contact with an electrically conducting switch terminal accommodated within the switch housing upon actuation of the switch module by the user, the flexible member being electrically connected to one of the first and second switch contacts, and the switch terminal being electrically connected to the other one of the first and second switch contacts.

7. The RFID device of claim 1, wherein the switching portion includes a pair of contact portions provided on an exposed surface of the switch housing and configured to be electrically connected by the user contacting the pair of contact portions, a first contact portion and second contact portion of the pair of contact portions being electrically connected to the first switch contact and the second switch contact, respectively.

8. The RFID device of claim 1, wherein the first switch contact and the second switch contact are configured as strip-like electrically conducting members extending in parallel on opposite sides of the central protrusion.

9. The RFID device of claim 8, wherein the first electrical contact and the second electrical contact are configured as a pair of rectangular land portions formed on a planar pre-laminate forming part of the device body.

10. The RFID device of claim 8, wherein the first electrical contact and the second electrical contact are each configured as a meandering end portion of the RFID antenna integrally formed with the first terminal end and the second terminal end, respectively.

11. The RFID device of claim 1, wherein the RFID antenna and the first and second electrical contacts are provided in the same plane.

12. The RFID device of claim 1, wherein the peripheral portion of the recess annularly surrounds the central recessed portion.

13. The RFID device of claim 12, wherein the peripheral connecting portion of the switch housing annularly surrounds the central protrusion.

14. A method of manufacturing a RFID device, comprising:

providing a planar pre-laminate, with an open-circuit RFID antenna having a first terminal end and a second terminal end, and a first electrical contact and a second electrical contact being formed on the pre-laminate, the first electrical contact and the second electrical contact being electrically connected to the first terminal end and the second terminal end, respectively;

laminating the pre-laminate with at least one further laminate layer provided on top of the pre-laminate to form a device body of the RFID device;

processing a region of a first surface of the device body to form a recess comprising a stepped configuration with a peripheral portion at a first depth from the first surface surrounding a central recessed portion at a second depth from the first surface that is deeper than the first depth, the recess exposing, on the peripheral portion, at least a portion of the first electrical contact and the second electrical contact;

inserting a switch module in the recess, the switch module comprising:

a switch housing comprising a stepped configuration substantially corresponding to the stepped configuration of the recess and having a peripheral connecting portion and a central protrusion;

a first switch contact exposed from the switch housing on the peripheral connecting portion;

a second switch contact exposed from the switch housing on the peripheral connecting portion; and a switching portion configured to electrically connect the first switch contact and the second switch contact upon actuation by a user; and electrically connecting the first switch contact to the first electrical contact and the second switch contact to the second electrical contact.

15. The method of claim 14, further comprising mounting the switch module in the recess at least in part by means of an electrically conducting adhesive.

16. The method of claim 14, wherein the step of processing includes milling the region of the first surface until the first electrical contact and the second electrical contact are exposed on the peripheral portion.

17. The method of claim 14, wherein the step of inserting comprises inserting the switch module such that a top surface of the switch housing is substantially in the same plane as the first surface.

18. The method of claim 14, wherein the first switch contact and the second switch contact are configured as strip-like electrically conducting members extending in parallel on opposite sides of the central protrusion.

19. The method of claim 18, wherein the first electrical contact and the second electrical contact are configured as a pair of rectangular land portions formed on the planar pre-laminate.

20. The method of claim 18, wherein the first electrical contact and the second electrical contact are each configured as a meandering end portion of the RFID antenna integrally formed with the first terminal end and the second terminal end, respectively.

* * * * *